United States Patent
Diel (10) Patent No.: US 7,122,120 B2
(45) Date of Patent: Oct. 17, 2006

(54) FILTER ELEMENT, PARTICULARLY FOR THE STATIC OR DEAD-END FILTRATION OF FLUIDS, AND CORRESPONDING FILTER DEVICE

(75) Inventor: Bernhard Diel, Rosdorf (DE)

(73) Assignee: Sartorius AG, Gottingen (DE)

( * ) Notice: Subject to any disclaimer, the term of this patent is extended or adjusted under 35 U.S.C. 154(b) by 37 days.

(21) Appl. No.: 10/520,435

(22) PCT Filed: Jun. 21, 2003

(86) PCT No.: PCT/EP03/06563

§ 371 (c)(1),
(2), (4) Date: Jan. 5, 2005

(87) PCT Pub. No.: WO2004/020072

PCT Pub. Date: Mar. 11, 2004

(65) Prior Publication Data

US 2005/0205484 A1    Sep. 22, 2005

(30) Foreign Application Priority Data

Aug. 27, 2002 (DE) ................... 102 39 241

(51) Int. Cl.
*B01D 29/54* (2006.01)
(52) U.S. Cl. ............ 210/232; 210/323.2; 210/450; 55/484; 55/496; 55/502
(58) Field of Classification Search ......... 210/232, 210/238, 323.2, 450; 55/484, 496, 502
See application file for complete search history.

(56) References Cited

U.S. PATENT DOCUMENTS

| | | | |
|---|---|---|---|
| 3,690,606 A | * | 9/1972 | Pall ................ 210/510.1 |
| 4,105,562 A | * | 8/1978 | Kaplan et al. ......... 210/232 |
| 4,133,379 A | * | 1/1979 | Nuzman et al. ....... 210/497.1 |
| 4,228,012 A | | 10/1980 | Pall |
| 4,609,465 A | | 9/1986 | Miller |
| 5,141,637 A | * | 8/1992 | Reed et al. ........... 210/232 |
| 6,306,298 B1 | * | 10/2001 | Diemer ............... 210/232 |

FOREIGN PATENT DOCUMENTS

| | | |
|---|---|---|
| DE | 26 38 142 A1 | 11/1977 |
| WO | WO 00/18486 | 4/2000 |

* cited by examiner

*Primary Examiner*—Thomas M. Lithgow
(74) *Attorney, Agent, or Firm*—Anthony J. Casella; Gerald E. Hespos (57) ABSTRACT

The invention relates to a filter element (F), particularly for the static or dead-end filtration of fluids, comprising an inner, essentially hollow supporting core (10) and at least one filter layer (12–14) placed thereon. The inner supporting core (10) is formed as a single piece together with a first end plate (20) and with a second end plate (30). The first end plate (20) comprises a connecting piece (22), which is provided therewith as a single piece and which is fluid-connected to the supporting core (10). The second end plate (30) has a seat (32), which is formed therein, is fluid-connected to the supporting core (10) and is adapted to the shape of the connecting piece (22) whereby enabling a connecting piece (22) of a second structurally identical filter element (F) to be at least partially inserted into the seat (32) in order to establish a fluid connection between the supporting cores (10) of the filter elements (F). The invention also relates to a filter device for fluids comprising a housing, which has an inlet for the fluid to be filtered and an outlet for the filtrate, and comprising two or more inventive filter elements (F) that are interconnected via the respective connecting piece (22) and the respective seat (32). The outlet is fluid-connected to a housing-side seat into which the connecting piece (22) of one of the at least two filter elements (F) can be at least partially inserted in order to establish a fluid connection between the outlet and the supporting cores (10) of the two or more filter elements (F).

10 Claims, 8 Drawing Sheets

FILTER ELEMENT, PARTICULARLY FOR THE STATIC OR DEAD-END FILTRATION OF FLUIDS, AND CORRESPONDING FILTER DEVICE

The present invention relates to a filter element, particularly for the static or dead-end filtration of fluids, and to a filter device which is provided with a multiplicity of filter elements.

Filter elements for static or dead-end filtration are known for example from WO 01/26774 A1 and are used in a large number of application areas, for example for the prefiltration of suspensions, final product clarification, fractionation of suspensions, bioburden reduction, sterile filtration and retention of particles.

Particularly in the case of sterile filtration in the beverages industry or pharmaceutical industry, particularly large filter elements, known as "jumbo filter cartridges", which usually have an overall height of 40" (101.6 cm) or more, are used with preference. Likewise used are integral filters, of the kind known from DE 38 05 361, which have a multiplicity of filter elements stacked one inside the other. The large filter elements have a large slurry holding capacity and are used in individual or multiple housings, mainly in applications in which particle filtration is the prime concern. On account of the large amounts of filtering material that are provided in such large filter elements, and on account of the large overall height of over 1 m, the fitting and removal of the filter element into and from a housing is extremely difficult, in particular due to the high dead weight (in particular in the wet state).

It is therefore an object of the present invention to ensure better ease of handling of a filter element.

This object is achieved according to the invention by a filter element and by a filter device. Preferred embodiments of the present invention are described below.

According to the invention, a filter element or a filter cartridge for fluids, particularly for the static or dead-end filtration of fluids, is provided, with an inner, essentially hollow supporting core or tubular supporting body and at least one filter layer arranged on it, the inner supporting core being formed in one piece with a first end plate or lower cartridge part and a second end plate or upper cartridge part, the first end plate having a connecting piece which is formed in one piece with it and is fluid-connected to the supporting core, and the second end plate having a receptacle or a connection formed in it or on it, which is fluid-connected to the supporting core and is adapted to the shape of the connecting piece in such a way that a connecting piece of a second structurally identical filter element can be at least partially inserted into the receptacle in order to permit a fluid connection between the supporting cores of the filter elements.

The filter element according to the invention is suitable for the filtration of a wide variety of fluids; liquids and/or gases with various contents, from a molecular solution through to a colloidal solution, through to a suspension, emulsion, aerosol, fume etc. up to a liquid and/or gas mixture.

Consequently, a modular construction of a large filter element comprising two or more (small) filter elements is advantageously possible, i.e. the invention makes it possible for a number of filter elements to be connected to one another by means of the respective connecting piece and the corresponding receptacle, so that the two or more supporting cores, which preferably receive the permeate or filtrate of the filtration, are fluid-connected to one another, and the fluid, preferably the permeate or filtrate, can be discharged from or fed into the supporting core of a filter element if appropriate through the supporting core of a filter element connected to it. "Modular construction" means in particular that each filter element is provided, like an independent filter element or filter cartridge, with a connecting piece on the first end plate, which permits a connection for example to a housing of a filter device, the receptacle of the second end plate preferably corresponding to a receptacle on the housing side, or being essentially identical to it, and consequently being able to be adapted with a connecting piece.

If a larger filter element is necessary, two or more smaller filter elements can be connected to one another, in that the connecting piece of the first end plate of one filter element is at least partially inserted into the receptacle of the second end plate of a further filter element. In this way it is possible for example for a 40" jumbo filter cartridge to be constructed or formed in a modular manner by four 10" filter cartridges that are connected to one another. On account of the connection of the connecting piece and receptacle, it is likewise advantageously possible to separate the unfiltrate side from the filtrate side. This advantageously provides flexible determination of the overall size or overall height, which makes it possible for the user to respond to his specific capacity requirements in that, in particular, he can put together the modularly assembled filter element in different sizes.

By forming the second end plate in one piece with a receptacle, it is ensured that the filter element can be connected to the connecting piece of a further filter element without an additional adapter, so that ease of handling is further improved.

When disassembling such a large filter element that is constructed in a modular manner, the individual small filter elements can be separated from one another. It is accordingly no longer necessary to manipulate the entire filter element, which is very heavy in the wet state, but instead the individual small filter element modules can be disassembled. It is also possible for individual filter element modules of the large filter element that are defective to be exchanged individually or separately, so that the amount of scrap is reduced and the overall useful life can be improved.

Furthermore, a technical production-related advantage is likewise obtained by the fact that it is now advantageously possible according to the invention to produce a single standard filter element (for example a 10" filter element) and to manufacture the larger filter elements (for example a 20" or a 40" filter element) in a modular manner from a multiplicity of standard filter elements, in particular without an additional adapter or the like, which is accompanied by alleviating effects with respect to both logistics and production technology and, as a result, cost-reducing effects.

According to a preferred embodiment of the invention, a latching device which releasably latches two filter elements that are connected to one another by means of the connecting piece and the receptacle is provided.

It is therefore advantageously ensured that two filter elements are not unintentionally detached from one another, in particular in the axial and/or radial direction.

The latching device preferably has at least one bayonet key and at least one bayonet lock which can be connected to the latter.

Accordingly, a latching engagement of a simple construction and great resistance of two filter elements connected to one another is possible in that the bayonet keys engage in one another in the rotational or azimuthal direction and consequently provide a securement in the axial direction.

It is further preferred for the latching device to have such a progression of the releasing moment that the releasing moment has a maximum in the azimuthal direction.

The risk of unwanted release of the latching device can therefore be reduced. Moreover, the releasing of individual filter elements from a multiplicity of filter elements that are connected and latched to one another can be made easier.

It is further preferred for the bayonet lock to have, in particular at its distal end, a projection, which can be inserted into an essentially corresponding recess of the bayonet key, in order to define the maximum of the releasing moment.

Consequently, a maximum of the releasing moment with the aforementioned advantages can be provided in a structurally simple way.

It is most preferred for the value of the maximum of the releasing moment to be increased by a gravitational force acting on the filter element. This is preferably achieved by the projection on the bayonet lock and by the recess of the bayonet key.

It is accordingly ensured that, if a large filter element with a multiplicity of individual filter elements is to be disassembled, the increased releasing moment of the lower filter elements caused by turning of the uppermost filter element only has the effect of releasing this upper filter element, while the other filter elements remain connected to one another. It is therefore advantageously possible to remove the filter elements one after the other without having to hold or fix the lower filter elements in each case, which improves overall ease of handling.

According to a further preferred embodiment of the present invention, the connecting piece and/or the receptacle is provided with a sealing device, which preferably has one or more peripheral seals (for example one or more O-rings). In this way, secure sealing of the filtrate side and the unfiltrate side can be ensured. In the case in which the sealing at the connecting piece is provided with the sealing device, it is also advantageously possible for a sealing between the connecting piece and a filter housing to be achieved when the filter element is correspondingly mounted in the filter housing.

It is preferred for a closure cap to be at least partially insertable into the receptacle for closing the receptacle.

Therefore, an uppermost filter element of a large filter element that is constructed in a modular manner from a multiplicity of individual filter elements can be advantageously closed off in order to separate the filtrate side from the unfiltrate side.

It is further preferred for the closure cap to have a latching element that is adapted to the latching device for latching to the filter element.

Accordingly, the closure cap can be securely latched.

It is most preferred for the filter layer to have at least one pleated membrane or a deep-bed filter made up of fibers.

According to the invention, a filter device for fluids is also provided, having:

a housing which has an inlet for the fluid to be filtered and an outlet for the filtrate, and at least one unit comprising at least two filter elements according to the invention or a preferred embodiment thereof, which are connected to one another by means of the respective connecting piece and the respective receptacle, the outlet being fluid-connected to a receptacle on the housing side, into which the connecting piece of one of the at least two filter elements of each unit can be at least partially inserted in order to establish a fluid connection between the outlet and the supporting cores of the two or more filter elements.

It is therefore advantageously possible according to the invention to provide filter devices with flexibly adaptable filtering properties which have filter elements which are constructed or connected to one another in a modular manner.

Further features, objects and advantages of the present invention are evident from the exemplary description which follows of preferred embodiments of the invention with reference to the drawing. In this respect, individual features or groups of features of individual embodiments that are described separately below can be combined as desired to form further embodiments of the invention.

Turning to FIGS. 1–8, a filter element F for fluids (i.e. liquids and/or gases with various contents, molecular or colloidal solutions, suspensions, emulsions, an aerosol, fume, liquid and/or gas mixture, etc.) according to a preferred embodiment of the invention is described below. The filter element F (FIG. 1) has a hollow or tubular supporting core or supporting body 10 with a filtrate tube with through-openings for fluids on the circumferential surface of the tube 11, a first end plate 20 and a second end plate 30, which are formed in one piece or as a unit with the supporting core 10, and an outer carrier 16 with through-openings 16A. The filter element F also has between the supporting core 10 and the outer carrier 16 at least one filter layer 12–14 as a filter medium, which in the embodiment shown has an inner drainage or supporting layer 12, a membrane and/or a deep-bed filter 13 made up of fibers and an outer drainage or supporting layer 14. The membrane 12 for microfiltration may comprise a multiplicity of polymer materials (for example cellulose hydrate, cellulose acetate (CA), polyacrylonitrile, polysulfone (PSU), polyether sulfone (PESU), polyamide (PA), polyvinylidene fluoride (PVDF), polytetrafluoroethylene (PTFE), polycarbonate (PC) and polyalkylene, such as polypropylene (PP)), including in a modified form, for example as membrane adsorbers, which surround porous cavities. The pore size may lie between approximately 0.05 and 5 µm, dependent on the actual application. The thickness of the membrane 12 for microfiltration may lie between approximately 15 µm and approximately 250 µm. The filter element F represented is used particularly for static or dead-end filtration. However, it is likewise conceivable for a filter element of a modular construction according to the present invention also to be used for crossflow filtration.

Figure 1:
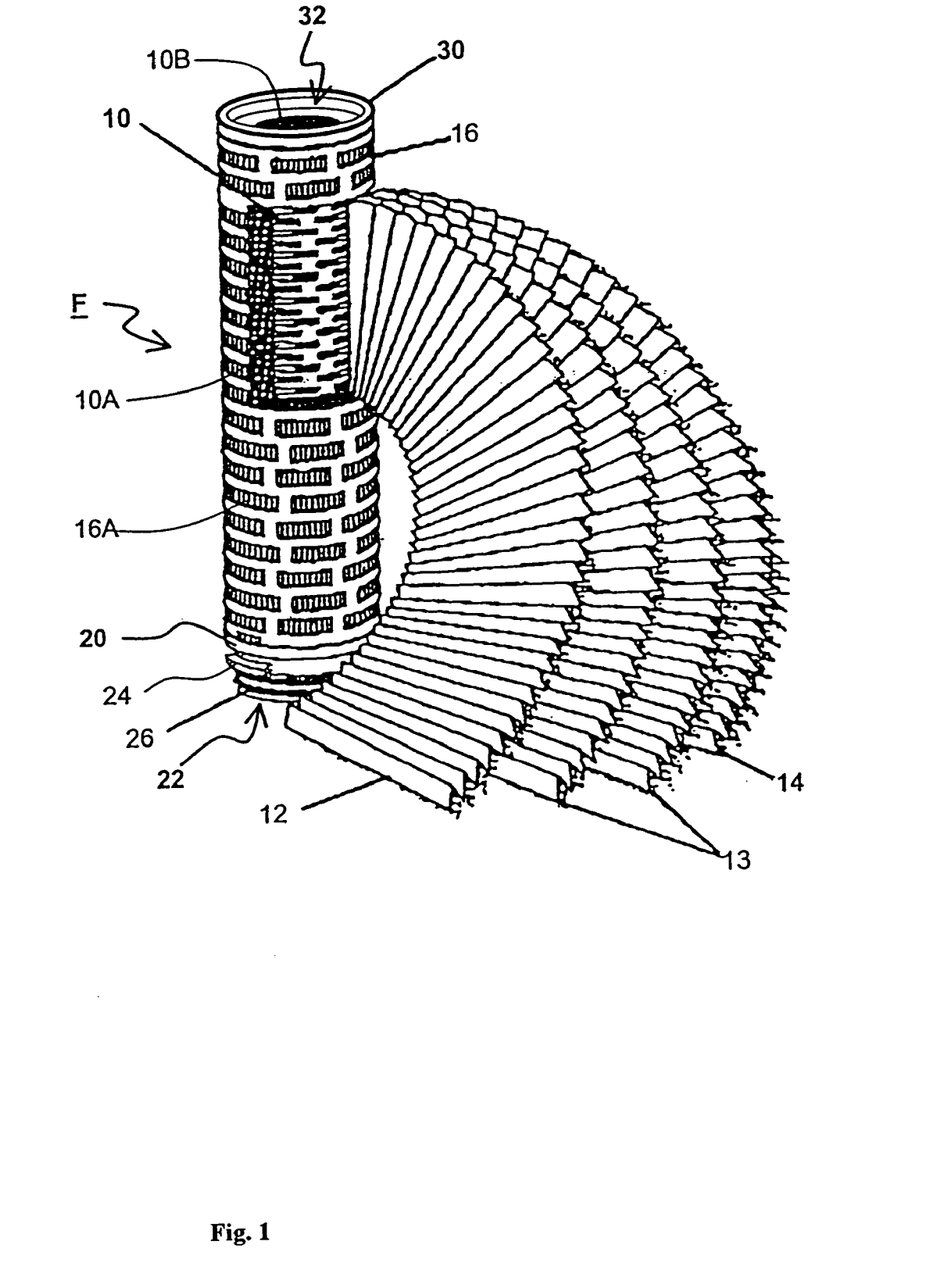
FIG. 1 shows a partly exploded view of a filter element according to a preferred embodiment of the invention.
Figure 2:
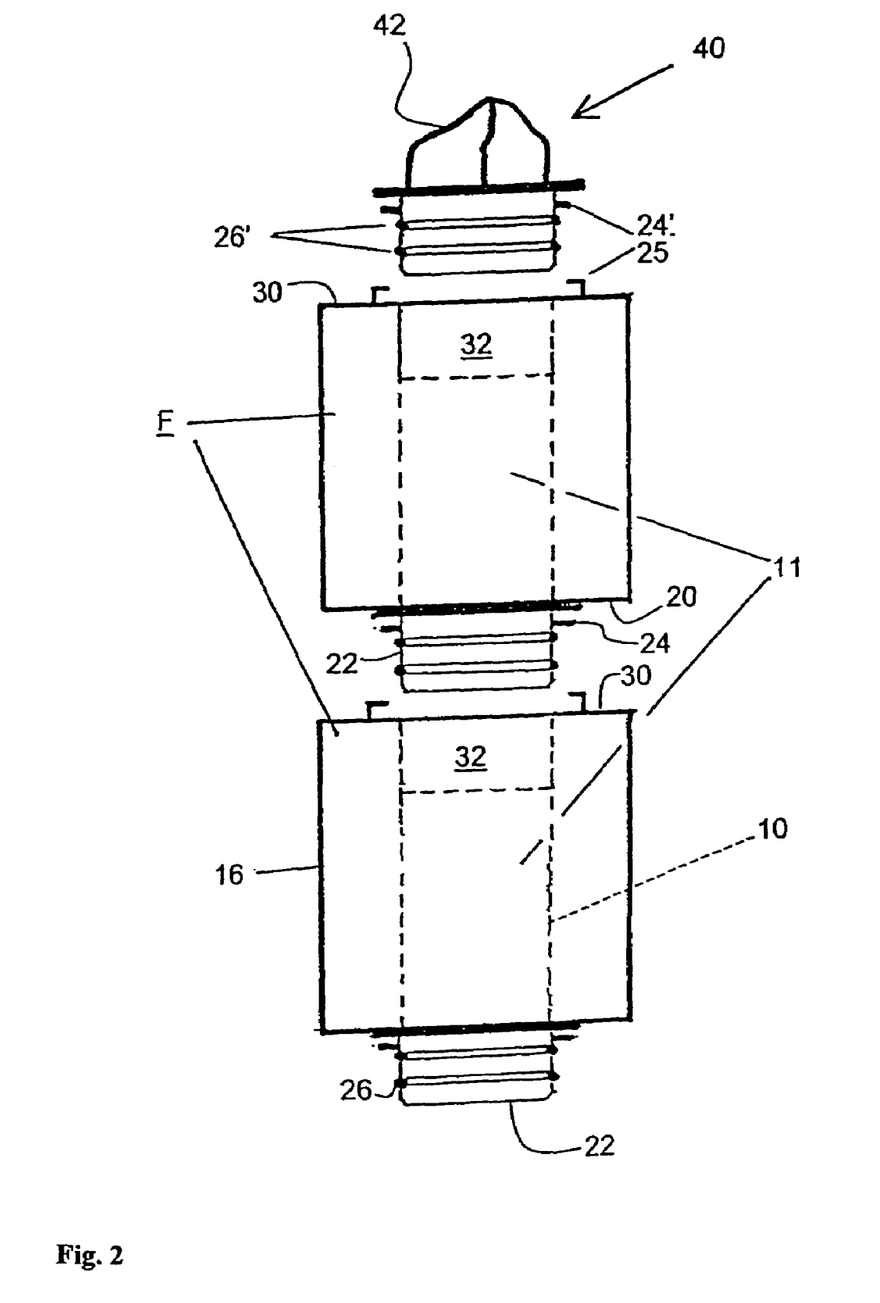
FIG. 2 shows a side view of a larger filter element, which can be joined together in a modular manner from two filter elements, according to a further preferred embodiment of the invention.

The hollow supporting core 10 serves for supporting the filter layer 12–14, in order in particular to withstand the compressive forces in the direction of filtration. The supporting core 10 defines in its interior a hollow space or a tube 11 (filtrate tube 11), in which the filtrate or permeate can enter through clearances 10A correspondingly provided in it. The filtrate can then be passed through the tube 11 to a connecting piece 22, which is described in more detail below. The supporting core 10 is preferably produced from thermoplastic polymer material.

The supporting core 10 consequently has first and second end plates 20 and 30 which are formed in one piece and are preferably molded or cast at the same time as the supporting tube 10 or are connected in one piece with it, for example by welding, thermoforming, etc. The end plates 20, 30 may likewise be bonded or fastened to the filter layer 12–14. The connection of the end plates 20, 30 to the supporting tube 10 and/or the filter layer 12–14 may be achieved for example with a resin binder (for example resins such as epoxy resins or polyurethane), additional polymer melts (for example polypropylene, polyethylene, polysulfone, polyester, etc.) and/or by direct thermal fusion of the end plates 20, 30 and/or of the supporting tube 10 or of the filter layers 12–14.

The first or lower end plate 20 has a connecting piece 22. This connecting piece 22 serves for connecting to a receptacle on the housing side (not shown) or to a receptacle 32 of the second end plate 30, which is described in more detail below and via which the filtrate is discharged to the outside or away from the filter element F. For this purpose, the connecting piece 22 has a through-opening 10C (FIG. 7), which is fluid-connected to the tube 11 of the supporting core 10. Therefore, the filtrate that gets into the hollow region (tube 11) of the hollow supporting core 10 can be discharged via the through-opening 10C of the connecting piece 22. The connecting piece 22 also has, for sealing contact with a counterpiece (whether the receptacle on the housing side or the receptacle 32 of the second end plate 30 that is described in more detail below), a sealing device which preferably comprises one or more O-rings 26 (two O-rings 26 are shown in FIGS. 1–5), preferably of unvulcanized rubber. When they are inserted into the counterpiece, the O-rings 26 are pressed between the piece 22 and the counterpiece (for example the receptacle 32) and in this way seal the filtrate side within the supporting body 10 or the connecting piece 22 from the unfiltrate or concentrate side outside the filter layer 12–14 or the end plates 20, 30.

The second or upper end plate 30 has a receptacle or a connection 32, which has a shape which corresponds to or is complementary to that of the connecting piece 22. Therefore, the connecting piece 22 of a filter element F can be at least partially inserted into the receptacle 32 of a second filter element F (see FIG. 2). The receptacle 32 is in fluid connection with an opening 10B of the supporting core 10 or the tube 11, so that fluid can flow out of one filter element F into the adjacent filter element F via the connecting piece 22, the receptacle 32 and the opening 10B. Accordingly, the cavities (tubes 11) of the supporting cores 10 of the two filter elements F are fluid-connected or can be fluid-connected to one another. The receptacle 32 of the second end plate 30 consequently preferably has an identical or similar shape or configuration to that of the receptacle on the housing side. Furthermore, an end cap or a closure adapter 40 may be inserted into the receptacle 32, in order to close off the supporting body 10 in a sealing manner, preferably by means of corresponding O-rings 26'. It is therefore possible for example to close the uppermost filter element F of a series of filter elements F inserted into one another or connected to one another, so that fluid entering the cavity (tube 11) of the supporting core 10 or the supporting cores 10 can be discharged through the lowermost connecting piece 22 to an outlet, in that this connecting piece 22 is inserted into the receptacle on the housing side. The closure cap 40 preferably has a centering projection 42 (FIG. 2) on its outer side, in order to center the filter element or elements F with respect to the housing.

Furthermore, the second end plate 30 has a locking or latching device 25, preferably in the form of a bayonet key 25. The latching device on the second end plate 30 can interact with a matching latching device 24, preferably in the form of a bayonet lock 24, on the connecting piece 22, in order to latch or secure two filter elements F with respect to one another in the axial direction. Therefore, turning of the two filter elements F with respect to one another is necessary (i.e. a relative displacement of one filter element F about the longitudinal axis with respect to the second filter element F), so that the bayonet lock 24 and the bayonet key 25 are displaced linearly with respect to one another along a turning direction VR. Alternatively or additionally, the latching device may have one or more (preferably essentially U-shaped) latching lugs, which are attached for example to the outer carrier 16, for example in the lower region, and can interact or latch with one or more corresponding projections on the outer carrier 16, for example in the upper region, so that two filter elements F that are connected to one another are secured against relative displacement both in the axial direction and in the radial direction.

Figure 4:
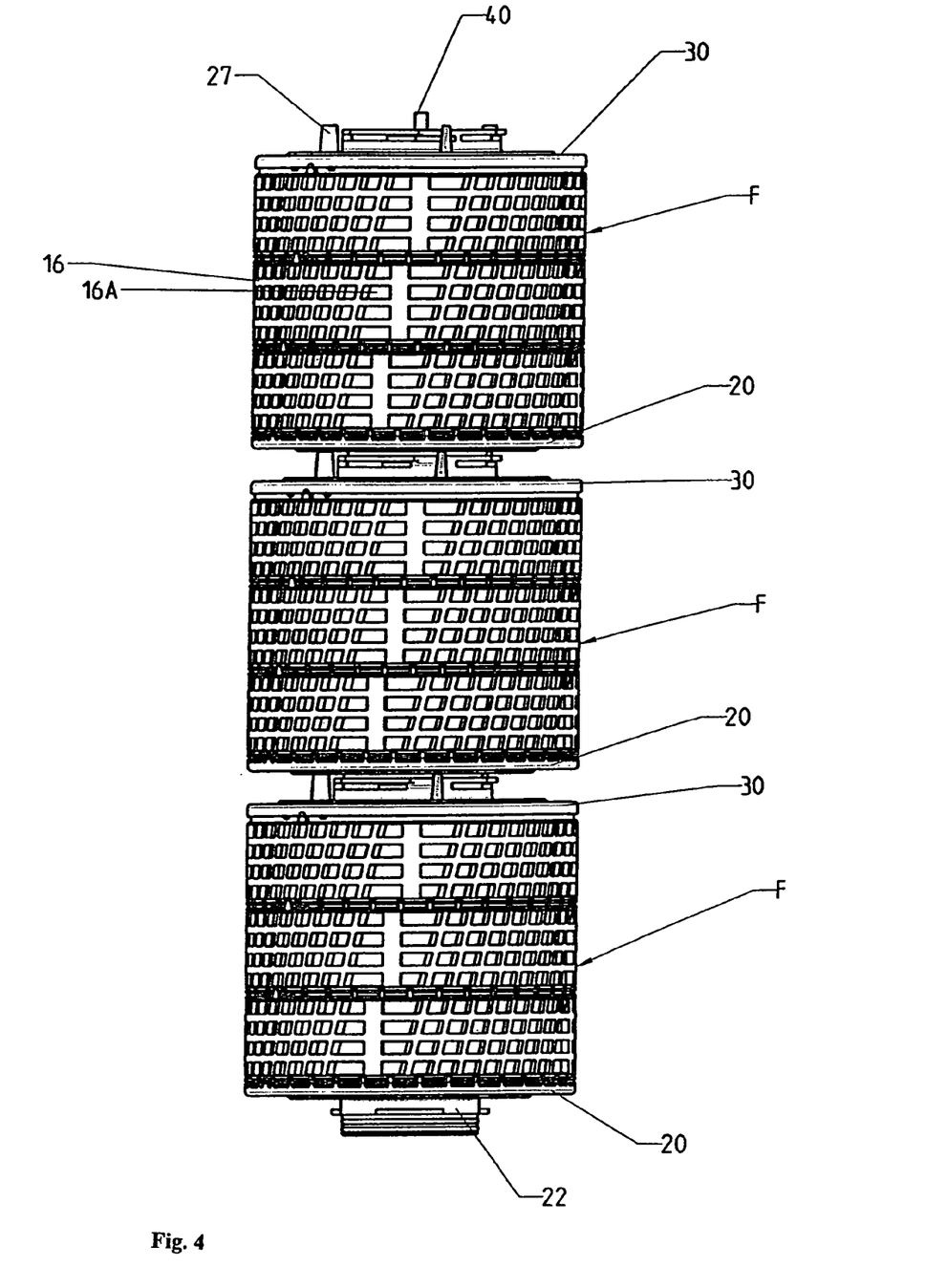
FIG. 4 shows a side view which shows three filter elements connected to one another in a modular manner according to a preferred embodiment of the invention.
Figure 5:
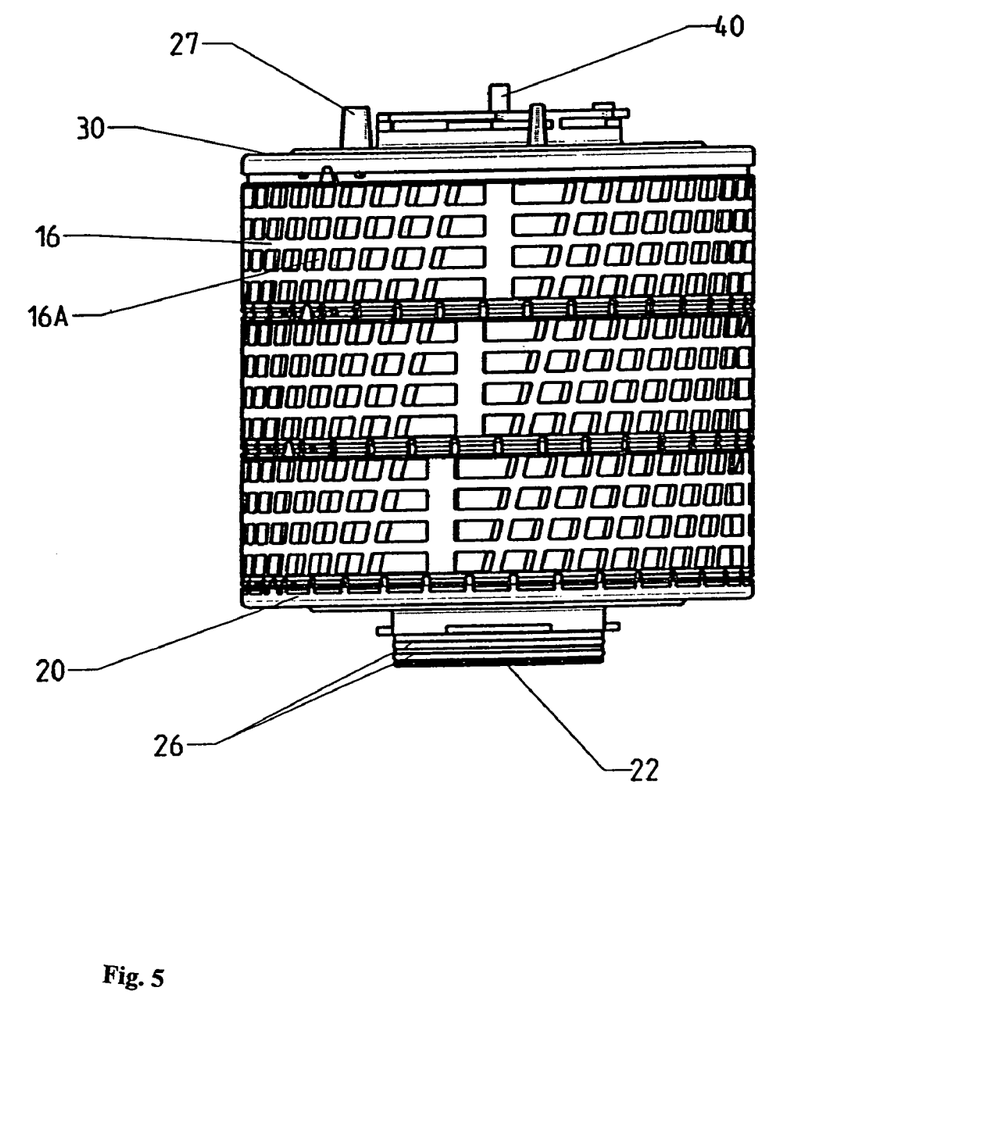
FIG. 5 shows a side view of a filter element with inserted closure cap according to a preferred embodiment of the invention.
Figure 6:
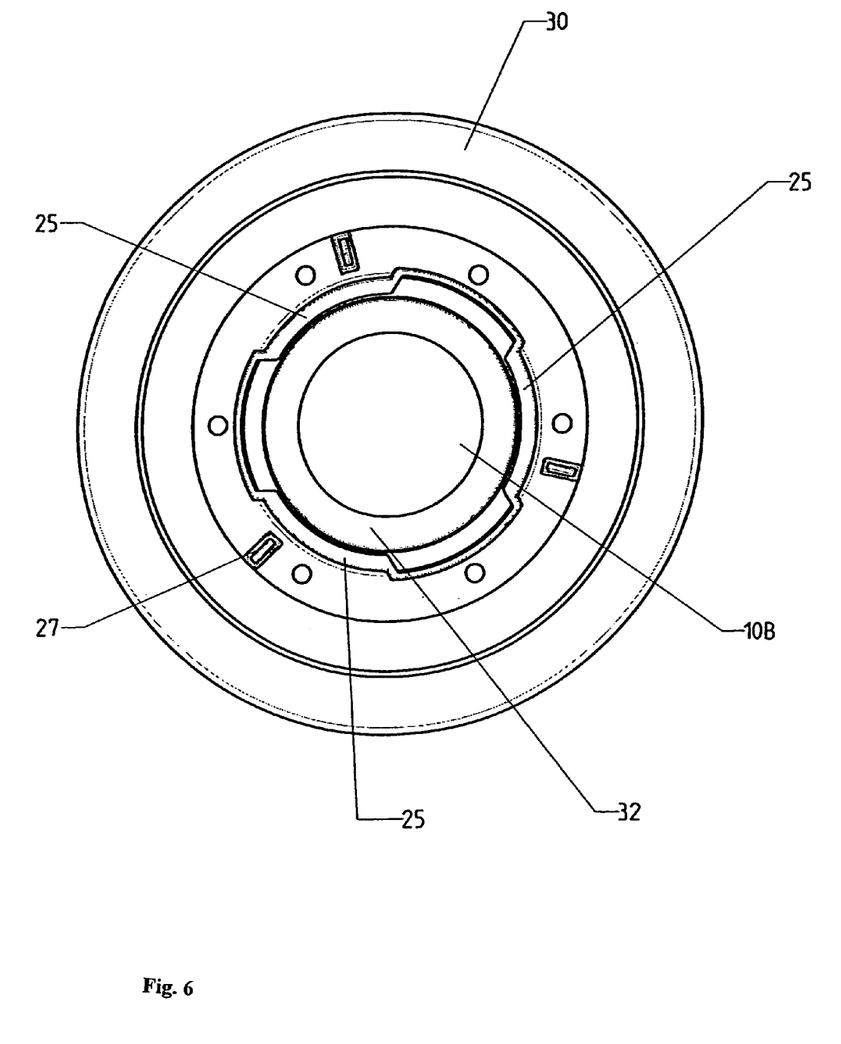
FIG. 6 shows a plan view of a second or upper end plate of a filter element according to a preferred embodiment of the invention.

According to the preferred embodiment that is represented in FIGS. 4 to 6, the second end plate 30 also has one or more supporting projections 27, which support an adjacent filter element F arranged on it, so that, particularly when two filter elements F are in vertical arrangement one above the other, the weight of the upper filter element F can be supported better.

Figure 3:
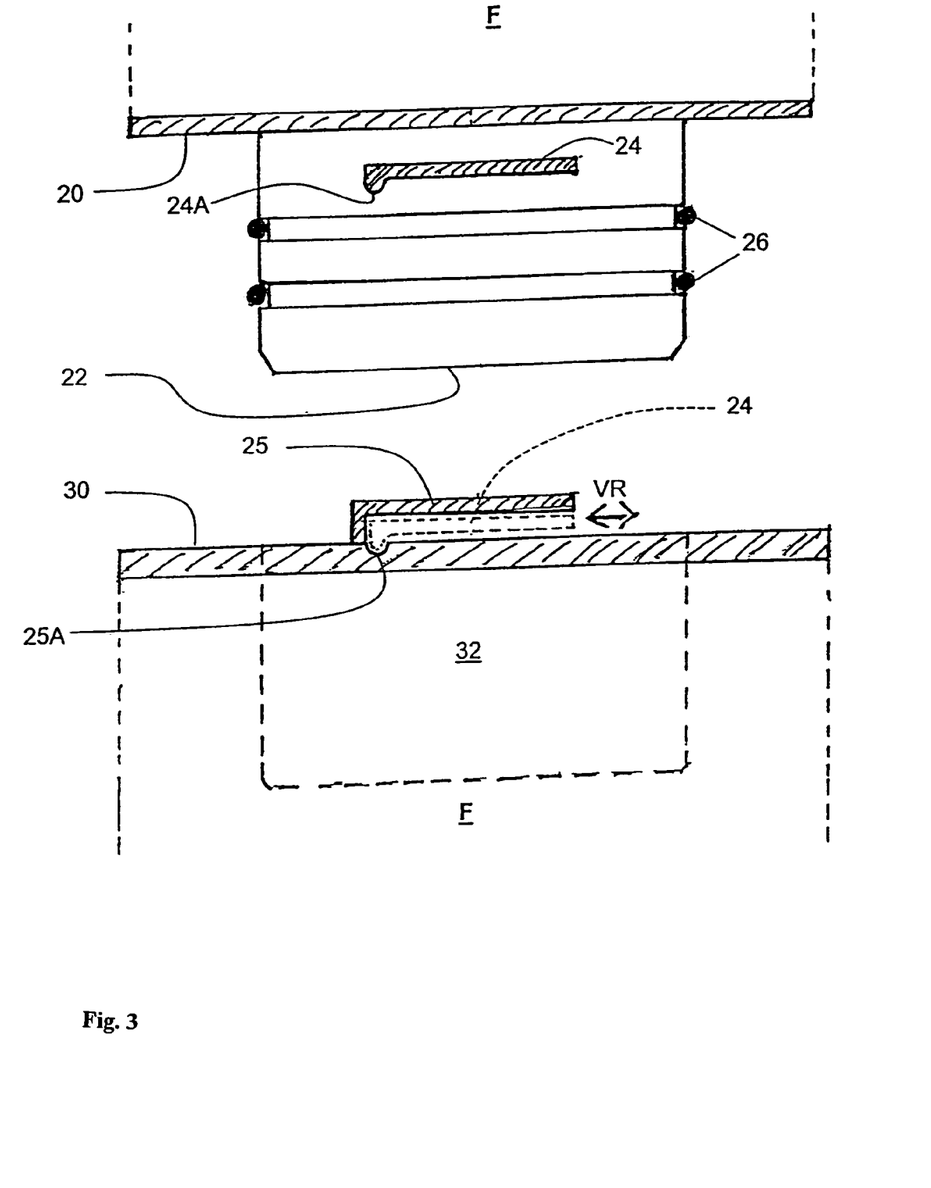
FIG. 3 shows a sectional view of a first and a second end plate of a filter element according to a further preferred embodiment of the invention.
Figure 7:
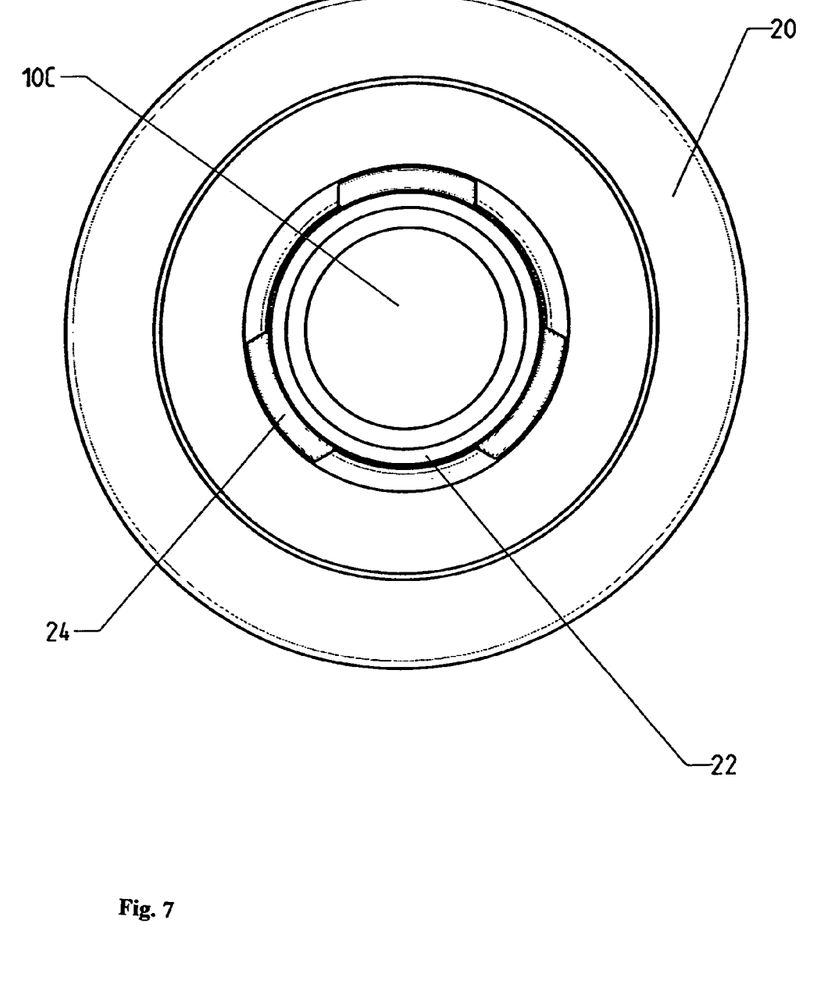
FIG. 7 shows a plan view of a first or lower end plate of a filter element according to a preferred embodiment of the invention.
Figure 8:
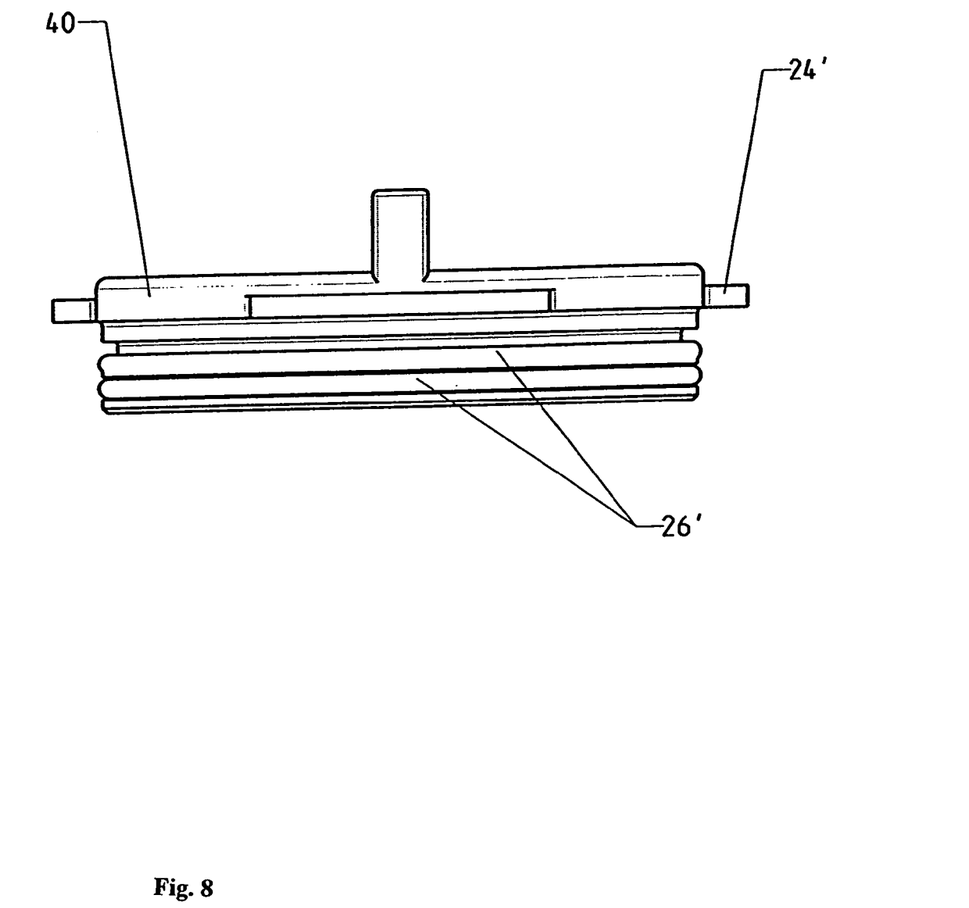
FIG. 8 shows a side view of a closure cap.

According to the preferred embodiment that is shown in FIG. 3, the bayonet lock 24 has, preferably at its distal end, a punctiform thickening or a projection or a nose 24A, which engages in a corresponding or exactly matching recess or depression 25A of the bayonet key 25. The projection 24A and the recess 25A have the effect that the releasing moment of the latching device 24, 25 preferably assumes a maximum value in an azimuthal position (or in a rotational position or alignment along the turning direction VR). In order to move the projection 24A back out of the corresponding recess 25A to open or release the connection of two filter elements F, it is necessary to overcome a greater frictional force (corresponding to the maximum in the releasing moment), which increases with increasing weight of the overall filter element construction arranged over it or exerting a load on it. Accordingly, when a number of filter elements F are connected, the frictional force is at its greatest on the lowermost connection (i.e. between the lowest two filter elements F) and at its least on the uppermost connection. As a result, the upper connection opens with preference when there is a rotation, and this is so in particular without the need for a further person securing unwanted opening of a connection or connections further below by securely holding the lower elements. As a difference from FIG. 3, the bayonet lock 24 that is represented in FIG. 7 does not have a projection 24A. The bayonet key 25 may either be provided in a projecting manner on the second end plate (FIGS. 3, 4) and/or as a set-back relief or recess within the receptacle 32 (see FIG.

6). Furthermore, according to a preferred embodiment of the invention, either only one bayonet lock 24/bayonet key 25 pair or a multiplicity of bayonet lock 24/bayonet key 25 pairs, peripherally spaced apart from one another, may be provided (in FIGS. 6 and 7, three pairs are represented by way of example).

The outer carrier 16 is provided with through-openings 16A, in order to permit flowing through of the fluid to be filtered (concentrate) from the outside to the filter layer 12–14. The outer carrier 16 advantageously increases the mechanical and/or thermal stability of the filter element F without significantly reducing the flow rate (i.e. the effective filter area). Furthermore, the outer carrier 16 facilitates the handling of the filter element F during installation and deinstallation. The supporting core 10, the filter layer 12–14 and the outer carrier 16 preferably have essentially the same coefficient of thermal expansion, so that the filter element F is bent or curved as little as possible by thermal changes (for example in steam sterilization).

Accordingly, as shown by way of example in FIG. 4, a multiplicity of filter modules F are joined together to form a larger modular filter module, ease of handling being ensured by the separable connection between the individual filter elements F.

A filter device according to a preferred embodiment of the invention that is suitable for example for use in the beverages industry, using the filter element F according to the invention, has (not shown) a housing made of high-grade steel, which comprises a housing base with connections for the supply to and disposal from the housing supported on housing legs. A bell-shaped upper housing part with a reinforcing rim is connected in a sealing manner to the housing base with flexible O-ring seals interposed, with the aid of clamping elements arranged in a distributed manner over the periphery. The upper housing part has at its highest point a venting connection with a valve arrangement. The upper housing part can be removed entirely from the housing base with the aid of handles after releasing the clamping elements, so that the housing base is also freely accessible from the inside for the fitting and removal of the filter element F or the filter elements F. The centrally arranged connection goes over into a housing aperture, which forms the actual sterile space, and the filter element F can be at least partially inserted into this housing aperture (i.e. connection on the housing side) via the lowermost connecting piece 22 by means of the O-ring seals 26. A number of locking elements arranged around the periphery of the housing base can be brought into engagement with locking noses or the bayonet lock 24 on the filter element F, so that the filter element F or the filter elements F altogether is/are locked in the axial direction and is/are secured against the dynamic pressure from the connections. The housing has, for example, an inside height of approximately 1300 mm, so that a filter element of a modular construction with a length of 1050 mm can be positioned in the housing.

LIST OF DESIGNATIONS

F filter module
10 supporting core
10A clearance
10B,10C opening
11 filtrate tube
12 inner drainage or supporting layer
13 membranes
14 outer drainage or supporting layer
16 outer carrier
16A through-opening
20 first (lower) end plate
22 connecting piece
24,24' bayonet key
24A projection
25,25' bayonet lock
25A recess
26 O-ring
27 supporting projection
30 second (upper) end plate
32 recess
40 closure cap
42 centering projection

The invention claimed is:

1. A generally cylindrical filter element (F) for fluids, with an inner, essentially hollow generally cylindrical supporting core (10) and at least one filter layer (12–14) arranged on it, the inner supporting core (10) being formed in one piece with a first end plate (20) at the first end of the filter element and a second end plate (30) at the second end of the filter element, the first end plate (20) having a connecting piece (22) which is formed in one piece with it and is fluid-connected to the supporting core (10), and the second end plate (30) having a receptacle (32) formed in it, which is fluid-connected to the supporting core (10) and is adapted to the shape of the connecting piece (22) in such a way that a connecting piece (22) of a second structurally identical filter element (f) can be at least partially inserted into the receptacle (32) of filter element (F) in order to permit a fluid connection between the supporting cores (10) of the filter elements (F and I) said filter element (F) further comprising a latching device (24, 25) which adapted to be releasably latch two filter elements (F and I) that are is adapted to be connected to one another by means of the connecting piece (22) and the receptacle (32) and wherein said latching device (24, 25) comprises at least one bayonet key (25) associated with the second end of the filter element (F) and at least one bayonet lock (24) associated with the first end of the filter element (F) such that said bayonet lock of the second end of the filter element (F) is adapted to latch with the bayonet key of said structurally identical filter element (f); and further comprising at least one supporting projection (27) extending axially from said second end plate (30) of filter element (F), and said projection (27) is adapted to support said structurally identical filter element (f) in a modular manner when the bayonet key of said structurally identical filter element (f) is latched to said bayonet lock of the second end of the filter element (F).

2. The filter element as claimed in claim 1, the filter layer (12–14) having at least one pleated membrane (13).

3. The filter element as claimed in claim 1, the filter layer (12–14) having a deep-bed filter (13) consisting of fibers.

4. The filter element as claimed in claim 1 the latching device (24, 25) having such a progression of the releasing moment that the releasing moment has a maximum in the azimuthal direction.

5. The filter element as claimed in claim 1, the bayonet lock (24) having at its distal end a projection (24A), which can be inserted into an essentially corresponding recess (25A) of the bayonet key (25), in order to define the maximum of the releasing moment.

6. The filter element as claimed in claim 4, the value of the maximum of the releasing moment being increased by a gravitational force acting on the filter element (F).

7. The filter element as claimed in claim 1, the connecting piece (22) and/or the receptacle (32) being provided with a sealing device (26), which preferably has one or more peripheral seals (26).

8. The filter element as claimed in claim 1, a closure cap (40) being at least partially insertable into the receptacle (32) for closing the receptacle (32).

9. The filter element as claimed in claim 8, the closure cap (40) having a latching element (24') that is adapted to the latching device (24, 25) for latching to the filter element (F).

10. A filter device for fluids, having: a housing which has an inlet for the fluid to be filtered and an outlet for the filtrate, and at least one unit comprising at least two filter elements (F and f) as claimed in any one of the preceding claims, which are connected to one another by means of the respective connecting piece (22) and the respective receptacle (32), the outlet being fluid-connected to a receptacle on the housing side, into which the connecting piece (22) of one of the at least two filter elements (F) of each unit can be at least partially inserted in order to establish a fluid connection between the outlet and the supporting cores (10) of the units comprising at least two filter elements (F); said filter element further comprising a latching device (24, 25) which releasably latches two filter elements (F) that are connected to one another by means of the connecting piece (22) and the receptacle (32) being provided and wherein said latching device (24, 25) has at least one bayonet key (25) and at least one bayonet lock (24) which can be connected to said latching device (24, 25); and further comprising at least one supporting projection (27) extending vertically from said end plate (30).

* * * * *